Dec. 30, 1941.  E. HANSMANN  2,268,072
DIRECT READING GAUGE
Filed June 17, 1937  2 Sheets-Sheet 1

Inventor:
Elwood Hansmann
By Williams, Bradbury, McCaleb & Hinkle
Attys.

Dec. 30, 1941.  E. HANSMANN  2,268,072
DIRECT READING GAUGE
Filed June 17, 1937  2 Sheets-Sheet 2

Inventor:
Elwood Hansmann
By Williams, Bradbury, McCaleb & Hinkle
Attys.

Patented Dec. 30, 1941

2,268,072

UNITED STATES PATENT OFFICE 2,268,072

DIRECT READING GAUGE

Elwood Hansmann, Highland Park, Ill., assignor to Stewart-Warner Corporation, Chicago, Ill., a corporation of Virginia Application June 17, 1937, Serial No. 148,723

5 Claims. (Cl. 73—51)

This invention relates to direct reading gauges, and more particularly to a gauge that gives a direct reading on the condition of the lubricating oil in an automobile.

The pressure under which the automobile engine oil normally circulates depends upon the following factors: as the speed of the engine increases, the oil pump, driven therefrom, circulates more oil and the pressure shown by the ordinary oil gauge rises. On the other hand, as the temperature of the motor and oil rises, the pressure drops, because of the decrease in the viscosity of the oil at increased temperatures. The oil pressure is also influenced by the bearing clearances and by other factors tending to decrease the viscosity of the oil, such as gasoline dilution.

Thus it will be seen that the ordinary oil pressure gauge will give a high reading when the motor is cold and a high reading at high speeds. Consequently, the operator must read the speedometer and the engine temperature indicator as well as the oil pressure gauge in order to arrive at a conclusion as to the proper functioning of the engine's oiling system.

With the above in mind, it is an object of this invention to provide a gauge that will indicate the performance of an automobile oiling system directly.

A further object is to provide an automobile oil gauge that automatically compensates for temperature and speed variations.

A further object is to provide an engine temperature indicator in connection with a gauge that indicates the condition of the engine's oiling system directly.

A further object is to provide means for compensating an automobile oil gauge for engine speed.

A further object is to provide an electric gauge that gives a direct reading on several variable factors conjunctively.

Other objects and advantages will become apparent from the following description and attached drawings, in which like indicia designate like parts throughout the same.

Figure 1:
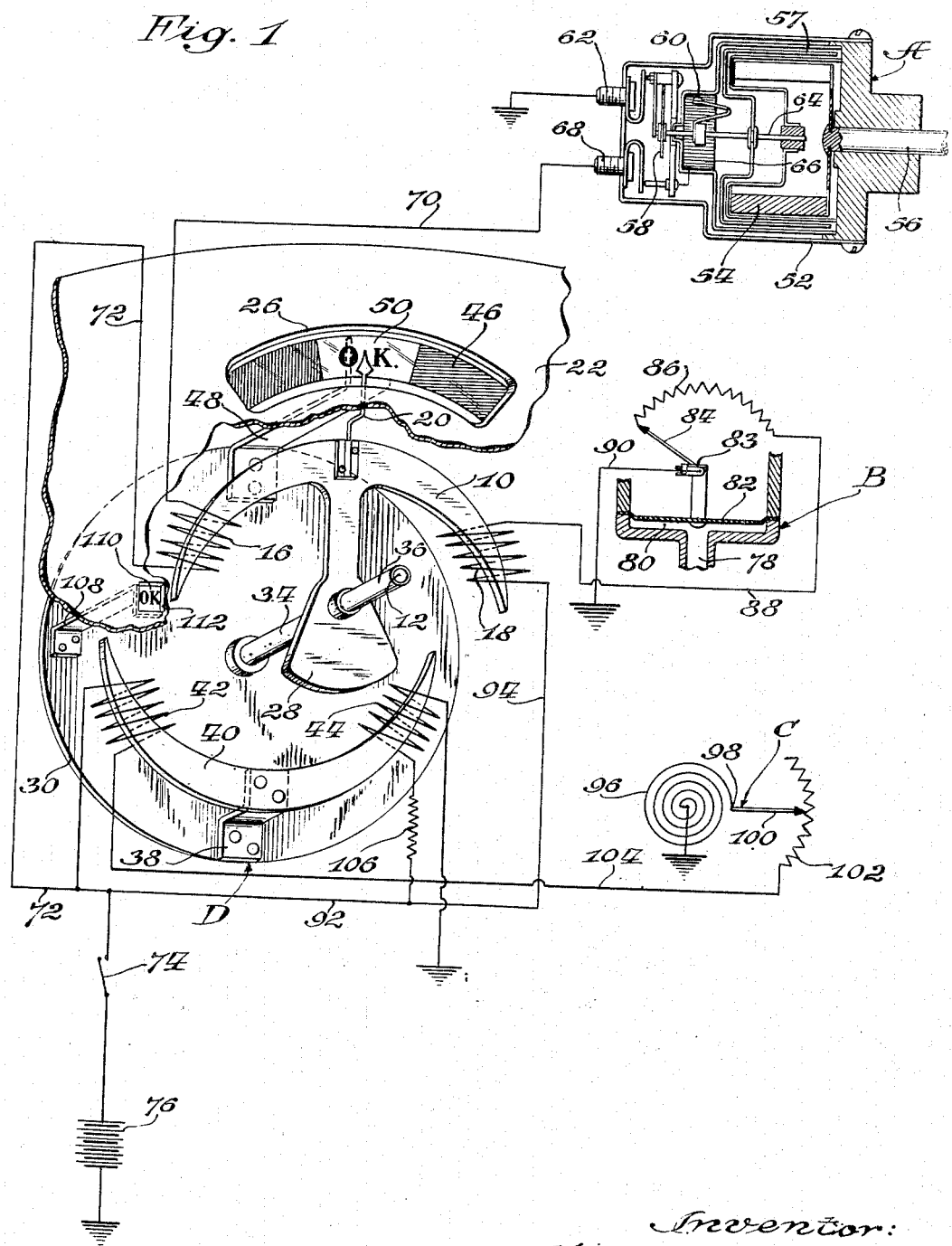
Fig. 1 is a diagrammatic representation of a device embodying this invention.
Figure 2:
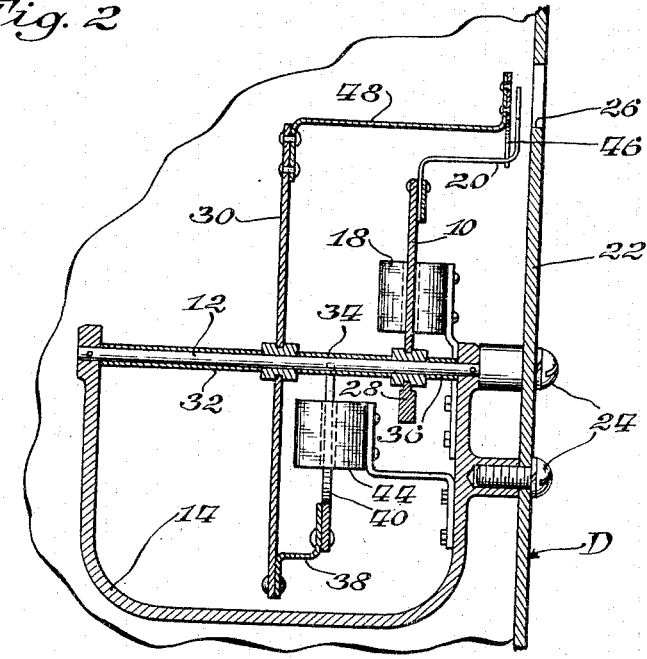
Fig. 2 is a vertical, longitudinal sectional view through a receiving unit comprising a part of this invention.

The device as illustrated in Figs. 1 and 2 consists in general of three resistors A, B and C which are variable relative to the engine speed, oil pressure, and engine temperature, respectively. The currents through the several resistors A, B and C energize separate solenoids in a receiving unit D, which may be mounted on the automobile dash, and which gives a direct reading as to the condition of the oiling system by means of apparatus to be described presently.

The receiving unit D is provided with a crescent shaped armature 10 which is pivotally mounted on a shaft 12 supported at its ends in a U-shaped casing 14. The ends of the armature 10 extend through solenoids 16 and 18 secured to the casing 14, while the center carries an upstanding pointer 20. The casing 14 is secured to the back of an automobile dash board 22 by means of screws 24 in such manner that the pointer 20 will be disposed behind an arcuate opening or window 26 in the dash board 22, so that as the pointer 20 moves from side to side the operator may see its position through this window.

The armature 10 is provided with a counterweight 28 below the shaft 12 that serves to maintain the pointer 20 and armature 10 in stable equilibrium.

A disc 30 is pivoted at its center on the shaft 12 in a position somewhat behind the armature 10, and the disc 30 and armature 10 are held in spaced relationship to each other and to the sides of the case 14 by short tube sections 32, 34 and 36 slipped upon the shaft 12 during assembly of the apparatus. The disc 30 has secured thereto by a bracket 38, a second crescent shaped armature 40 with its opposite ends disposed within the solenoids 42 and 44.

A dial 46 is attached to the upper portion of the disc 30 by means of a bracket 48 and is disposed behind the window 26 and pointer 20. That part of the dial 46 which shows through the window 26 bears indicia including an arcuate segment 50 with which the pointer 20 coincides when the engine oiling system is operating properly. If the engine oil is too thin or exhausted, the pointer 20 coincides with a portion of the indicia which so indicates, and similarly, if the engine oil is too thick the pointer coincides with another portion of the indicia.

The engine speed controlled variable resistor A may be of any well known design, one form of which consists of a housing 52 containing a permanent magnet 54 rotated by a shaft 56 which is driven from the engine. The rotating magnet 54 is positioned within a speed cup 57 and exerts a torque on the cup tending to rotate it in the same direction against the tension of a helical spring 58. Thus, the faster the magnet 54 is revolved, the greater will be the torque on the speed cup 57, and consequently the greater the arc through which the cup will be moved. A slider 60 in electrical contact with a binding post 62 is attached to the speed cup 57 by the shaft 64 and is moved over the surface of a resistance coil 66 adjacent thereto as the cup 57 is rotated by the magnet 54. One end of the coil 66 is brought out at 68 and is connected into the electrical circuit, as will be described presently.

When the engine is at rest, the spring 58 revolves the slider 60 and speed cup 57 into such a position that the slider 60 will be in contact with the end of the coil 66 farthest from the terminal 68. As the engine speeds up and the shaft 56 and magnet 54 revolve faster, the speed cup 57 and slider 60 will be moved in the direction of rotation of the magnet 54, and the slider 60 will be in contact with a portion of the coil 66 electrically closer to the terminal 68.

In the circuit diagram in Fig. 1, the binding post 62 is grounded. The lead 68 of the resistance coil 66 is connected directly to one end of the solenoid 16 by a wire 70, while the other end of the solenoid 16 is connected by a wire 72, single pole single throw switch 74, and automobile battery 76 to the ground.

Thus, as the engine increases in speed, the resistance in the circuit comprising the battery 76, switch 74, wire 72, solenoid 16, wire 70, resistance unit 66, slider 60, and back to the battery 76 through the ground, will become less, thereby allowing greater energization of the solenoid 16, and a consequent greater tendency for the armature 10 and pointer 20 to be deflected to the left.

The oil pressure controlled variable resistor B, as shown in Fig. 1, is provided with a tube 78 through which oil under pressure from the engine is led into a chamber 80 closed by a flexible diaphragm 82. As the variations in pressure in the chamber 80 cause the diaphragm 82 to move inwardly and outwardly, this motion is transmitted through suitable toggle mechanism 83 to a slider 84, which moves over a resistance coil 86 from left to right, as shown in Fig. 1, as the oil pressure in the engine rises. The resistance coil 86 is connected at the end toward which the slider 84 moves as the oil pressure rises, to one end of the solenoid 18 by a wire 88. The slider 84 is grounded through a wire 90, and the battery 76 is connected to the other end of the solenoid 18 by switch 74 and wires 92 and 94.

Thus, as the oil pressure rises, the diaphragm 82 will be deflected outwardly, thereby moving the slider 84 to the right and energizing the solenoid 18 through the battery 76, switch 74, wires 92 and 94, solenoid 18, wire 88, resistance coil 86, slider 84, wire 90 and back to the battery through the ground. This energization of the solenoid 18 attracts the armature 10 and tends to move the armature and pointer 20 to the right.

Therefore, as the motor speed increases, solenoid 16 tends to move the pointer 20 to the left, and as the oil pressure increases, solenoid 18 tends to move the pointer to the right. Since ordinarily an increase in speed brings about an increase in oil pressure, these two forces will balance each other and maintain the pointer 20 in approximately a stationary position. If the motor speed increases, but because of some fault in the oil system the oil pressure does not increase correspondingly, then the solenoid 16 will be more highly energized than the solenoid 18, and the pointer 20 will be tilted to the left. This tilting of the pointer to the left notifies the operator that either there is some fault in the oiling system or else the oil is too thin.

Likewise, too great an oil pressure in relation to motor speed causes the pointer 20 to be tilted to the right, thereby giving notice that either the oil pressure should be reduced or else a thinner oil used.

The motor temperature controlled variable resistor C is provided with a helically wound bimetal strip 96 which uncoils when heated by an increase in the engine temperature. The outside end 98 of this helical thermostatic unit 96 is attached to a slider 100 which moves over a resistance coil 102 as a variation in temperature causes actuation of the thermostatic unit.

The end of the resistance coil 102 toward which the slider 100 moves when the engine temperature decreases, is connected to one end of the solenoid 42 by a wire 104. The other end of the solenoid 42 is connected to the wire 72 while the slider 100 is grounded.

The solenoid 44 is grounded at one end and the other end is connected to the wire 92 through a fixed resistance unit 106.

The solenoid 44, since it receives at all times substantially the same amount of current, exerts a constant tendency to move the armature 40 to the right while the solenoid 42, when energized, tends to move the armature 40 to the left. Therefore, as the current in the solenoid 42 is carried by the temperature controlled resistor C, the armature 40 will be moved to the left when the temperature is low and to the right when the temperature is high. Since the armature 40 is connected to the pivoted disc 30 which carries the dial 46, the dial 46 will be moved to the right as the temperature drops, and to the left as the temperature rises. Since most automobiles at present are provided with thermostats which keep the motor temperature substantially constant, I prefer to so proportion the resistances 106 and 102 that the indicia 50 will be in a vertical position after the engine has warmed up and is operating within its normal temperature range. This temperature compensation is provided to compensate for the varying viscosity of the oil at different temperatures. For instance, when the motor is started with the oil cold and thick, the oil pressure will be high, consequently the pointer 20 will be titled to the right as previously described. However, since the temperature is low, the dial 46 will also be tilted to the right bringing the proper indicia in line with the pointer 20. As the oil becomes warmer, the current in the solenoid 42 will decrease and allow the dial 46 to swing to the left, while at the same time the oil pressure will drop and allow the pointer 20 to move to the left into alignment with the same indicia in its new position. Thus, the instrument will indicate the functioning of the oiling system regardless of the oil temperature.

Since the disc 30 is moved under the influence of the engine temperature only, as above described, a bracket 108 carrying indicia 110 is secured thereto and moves with the disc 30. An opening or window 112 is properly situated in the dash 22, so that when the engine is at proper operating temperature the indicia 110 may be seen through this window. If desired a temperature indicating scale may be used instead of the indicia 110.

Figure 3:
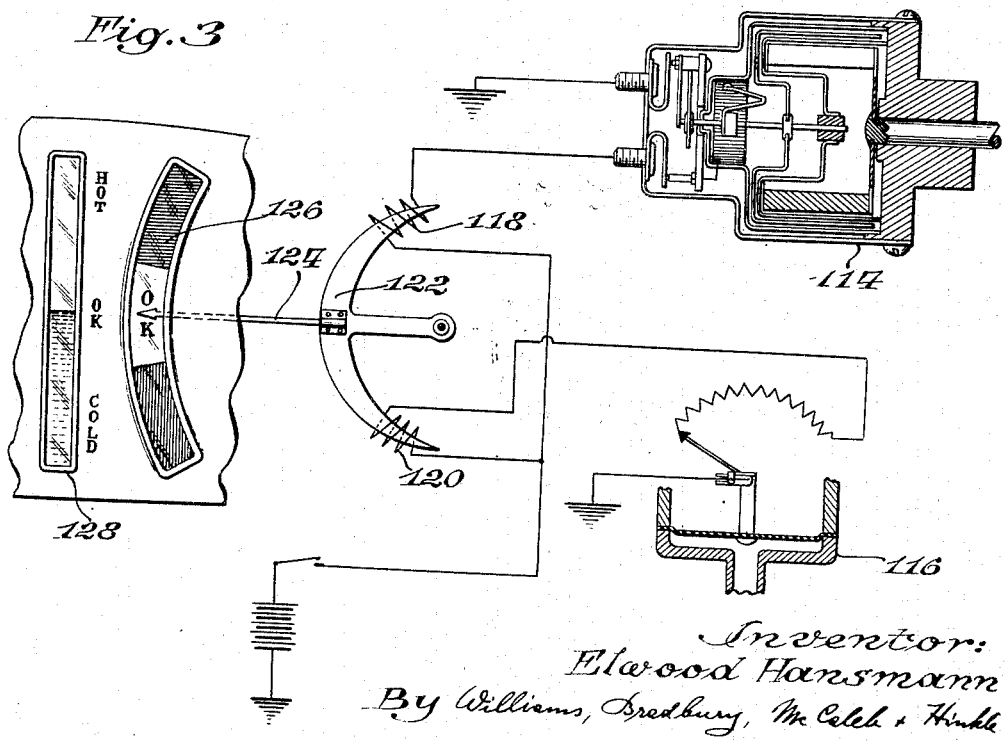
Fig. 3 is a diagrammatic representation of a simplified modification of this invention.

The embodiment of this invention illustrated in Fig. 3 is much like that shown in Figs. 1 and 2, excepting that it is not provided with the temperature compensating feature.

The two variable resistors 114 and 116 are the same as the resistors A and B, respectively, in the previously described device, and are connected to solenoids 118 and 120 in the same manner as the solenoids 16 and 18 are connected to the resistors A and B. These solenoids 118 and 120 are positioned to attract opposite ends of a pivoted armature 122 when energized, and thus deflect a pointer 124 secured to the armature in the same manner as the armature 10 and pointer 20 are deflected by the solenoids 16 and 18.

Thus, it will be seen that the pointer 124 is controlled by the oil pressure and motor speed in the same manner as the pointer 20. However, in the device as shown in Fig. 3, a stationary dial 126 is provided and, therefore, the operator must take into consideration the reading of a motor temperature indicator 128, which is usually provided with the automobile, before arriving at a conclusion as to the proper functioning of the oiling system.

In operation, the device, as illustrated in Figs. 1 and 2, is put into operation by closing the switch 74, which may also serve as the ignition switch of the automobile. Before the engine is started there will be no oil pressure and no engine speed, consequently the pointer 20 will be in a vertical position. However, since the engine is cold the indicia 50 will be tilted to the right, as seen in Fig. 1. When the engine is started with the oil cold, the oil pressure will be relatively high in relation to the engine speed. Therefore, the solenoid 18 will be more highly energized than the solenoid 16 and the pointer 20 will be swung to the right into alignment with the indicia 50, thereby indicating that, considering the oil temperature and motor speed, the oil pressure is at the proper level.

As the motor becomes warmer, both the indicia 50 and the pointer 20 will move into a vertical position because of the decrease in current in the solenoids 18 and 42. Thus, so long as the oiling system is functioning properly, the pointer 20 will be in alignment with the indicia 50, although the pointer will not always be in a vertical position.

If the oil becomes too thin, or for some other reason, such as a loose bearing, the pressure drops below a safe level, the pointer 20 will be inclined to the left of the indicia 50. If oil is added to the motor which is too heavy, or if for any other reason the oil pressure becomes too high, the pointer 20 will incline to the right of the indicia 50.

The operation of the device as shown in Fig. 3 is similar to the above, excepting that since the indicia does not move, the motorist must make the proper temperature compensation mentally after consulting the temperature gauge 128. For instance, when the motor is started cold, the pointer 124 will be inclined downwardly, which would indicate that the pressure is too high, excepting for the fact that the temperature indicator 128 is below normal, and likewise if the pointer 124 is inclined upwardly it indicates that the oil is too thin or for some reason the pressure is subnormal, unless the temperature indicator is also above normal.

Although I have described my invention as an automobile oil pressure gauge, it should be understood that I do not limit myself thereto, since this gauge is equally effective when used for indicating or studying other operating conditions wherein the several factors vary in some related manner. It is not necessary that the factors vary in direct ratio, since tapered resistance units may be employed to provide the proper compensation. For instance, in some automobiles the oil pressure does not increase proportionately to the increase in engine speed. If it should be found that the oil pressure increases directly as the engine speed from 5 to 25 miles per hour, then the portions of the two resistance units in the resistors A and B covering that range are in constant ratio. If above 25 miles per hour, the pressure rises slowly in comparison to the speed increase, then the resistance units should be tapered over this range, so that the change in resistance will be the same in both resistors even though the slider in one moves farther than the slider in the other during the same period.

Although the invention has been disclosed in connection with the specific details of a preferred embodiment and modification thereof, it must be understood that such details are not intended to be limitative of the invention except in so far as set forth in the accompanying claims.

Having thus described my invention, what I claim as new and useful and desire to secure by Letters Patent of the United States is:

1. A direct reading gauge of the type described comprising in combination, a movable indicator, electromagnetic means to move said indicator in one direction, separate electromagnetic means to move said indicator in another direction, movable indicia carrying means constituting a scale for said indicator, and a third electromagnetic means to move said indicia carrying means, a variable resistor responsive to pressure variations in an internal combustion engine lubricating system, a second variable resistor responsive to temperature variations in the lubricating system, a third variable resistor responsive to engine speed variations, a source of current supply, and electrical circuits connecting each of said resistors in series with one of the electromagnetic means and the source of current supply.

2. A device for indicating the condition of the lubricant of an internal combustion engine lubricating system comprising, a movable indication, said means being responsive to pressure in the lubricating system, a second means to move said indicator in another direction, said second means being responsive to the engine speed, a movable indicia positioned adjacent the indicator and constituting a scale therefor, means to move said indicia in substantially the same direction as the above-said one direction, the last said means being responsive to the temperature of the lubricating system.

3. A direct reading device for indicating the condition of the lubricant of an internal combustion engine lubricating system comprising, a temperature responsive variable resistor subject to temperature changes in the lubricating system, a pressure responsive variable resistor subject to pressure changes in said system, a speed responsive variable resistor subject to changes in engine speeds, a movable armature, an electrical circuit including the pressure responsive resistor adapted to move the armature in one direction, an electrical circuit including the speed responsive resistor to move said armature in another direction, an indicator secured to said armature, a second movable armature, an electrical circuit including the temperature responsive resistor adapted to move the second armature, and indicia secured to the second armature and positioned adjacent the indicator and constituting a scale therefor.

4. In an internal combustion engine oil indicating device the combination comprising, an engine speed controlled variable resistor, an engine oil pressure controlled variable resistor, an engine temperature controlled variable resistor, a fixed resistor, a movable armature with an indicator secured thereto, an electromagnet to move said armature in one direction, said electromagnet receiving current through the engine speed controlled variable resistor, a second electromagnet to move said armature in another direction, said second electromagnet receiving current through the engine oil pressure controlled variable resistor, a second movable armature with indicia secured thereto said indicia constituting a scale for said indicator, a third electromagnet to move said second armature in one direction, said third electromagnet receiving current through the engine temperature controlled variable resistor, and a fourth electromagnet to move said second armature in another direction, the said fourth electromagnet receiving current through the fixed resistor.

5. A direct reading indicating system of the type described comprising, a movable indicator, electromagnetic means to move said indicator in one direction, electromagnetic means to move said indicator in another direction, movable indicia carrying means positioned adjacent the indicator, a third electromagnetic means adapted to move said indicia carrying means in one direction, a fourth electromagnetic means to move said indicia carrying means in another direction, three variable resistors, a source of current supply, a plurality of electrical circuits to connect each of the variable resistors in series with one of the electromagnetic means and with the source of current supply, a fourth resistor, and an electrical circuit to connect the fourth resistor in series with the fourth electromagnetic means and the source of current supply.

ELWOOD HANSMANN.